United States Patent
Wang et al.

(10) Patent No.: US 9,282,023 B2
(45) Date of Patent: Mar. 8, 2016

(54) RESISTANCE ARRANGING SYSTEM AND METHOD BASED ON RS-485 NETWORK

(71) Applicant: MOXA INC., New Taipei (TW)

(72) Inventors: Yan-Chi Wang, New Taipei (TW); Wen-Kai Shih, New Taipei (TW)

(73) Assignee: MOXA INC., New Taipei (TW)

( * ) Notice: Subject to any disclaimer, the term of this patent is extended or adjusted under 35 U.S.C. 154(b) by 48 days.

(21) Appl. No.: 14/254,908

(22) Filed: Apr. 17, 2014

(65) Prior Publication Data

US 2015/0304203 A1   Oct. 22, 2015

(51) Int. Cl.
*H04B 3/20* (2006.01)
*H04L 12/26* (2006.01)

(52) U.S. Cl.
CPC .................................. *H04L 43/50* (2013.01)

(58) Field of Classification Search
None
See application file for complete search history.

(56) References Cited

U.S. PATENT DOCUMENTS

| | | | |
|---|---|---|---|
| 5,444,854 A * | 8/1995 | Mathis et al. | 710/5 |
| 5,659,680 A * | 8/1997 | Cunningham et al. | 714/25 |
| 2003/0112014 A1* | 6/2003 | Ayala et al. | 324/522 |
| 2006/0100812 A1* | 5/2006 | Sturges et al. | 702/117 |
| 2013/0111088 A1* | 5/2013 | Cho et al. | 710/110 |
| 2013/0149912 A1* | 6/2013 | Oberski | H01R 24/64 439/676 |

* cited by examiner

*Primary Examiner* — Anh-Vu Ly
(74) *Attorney, Agent, or Firm* — Chih Feng Yeh; Huntington IP Consulting Co., Ltd.

(57) ABSTRACT

A resistance arranging system and method based on a RS-485 network are disclosed. A detection packet is generated and a circuit loop is received, so that the detection packet is taken as a basis signal and the received detection packet through the circuit loop is taken as a comparison signal, and push-up, pull-down and terminal resistors are arranged by controlling the switch according to the basis signal and the comparison signal, whereby achieving in a technical efficacy of convenience of promoting the resistors arrangement.

10 Claims, 4 Drawing Sheets

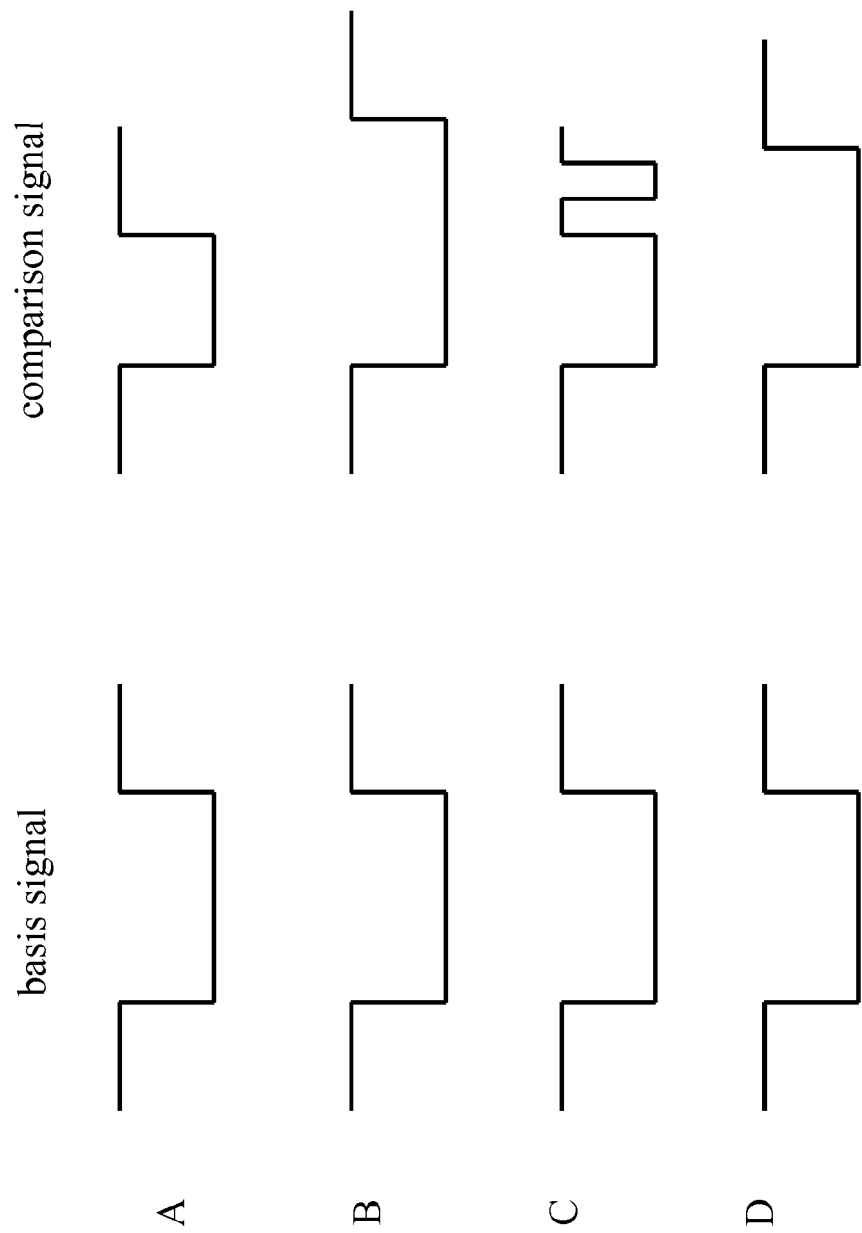

RESISTANCE ARRANGING SYSTEM AND METHOD BASED ON RS-485 NETWORK

BACKGROUND OF RELATED ART

1. Technical Field

The present invention relates to a resistance arranging system and method, and particularly to a resistance arranging system and method based on a RS-485 environment according to a packet comparison result.

2. Related Art

Recently years, with prevalence and vigorous development of the network, various communications standards have come to present crowdedly. Among them, the RS-485 communications standard is a regular communications standard in industry environment, Generally, the RS-485 is typically adjusted to have a proper push-up resistor, a pull-down resistor, and a terminal resistor when the overall installment is completed so as to reduce interference and reflection on the network and enable the communications to be normal. However, the above adjustment fashion may be manually adjusted correspondingly after the communications quality on the network is ascertained. Therefore, an inconvenience issue of arranging the resistors is arisen.

In response, a method for automatically arranging the terminal resistor has been proposed. This technology detects a connection state of the apparatus and controls a connection manner of the switch, so that the first and last apparatuses on the RS-485 network use the terminal resistor. However, the method may only automatically determine if the terminal resistor is to be used, and has an inefficient result on reduction of interference and reflection. At the same time, the push-up resistor and the pull-down resistor may not be automatically arranged.

Therefore, the above method still has the issue of inconvenience of resistor arrangement.

In view of the above, it may be known that the inconvenience issue of resistor arrangement has been long encountered in the prior art. Therefore, there is quite a need to set forth an improvement technology to settle down this issue.

SUMMARY

The present invention discloses a resistance arranging system and method based on a RS-485 network.

The resistance arranging system based on a RS-485 network according to the present invention comprises a resistor series, comprising a pull-down resistor, a first switch, a second switch, a terminal resistor, a third switch and a push-up resistor in series, wherein the first, second and third switches are electrically connected as a predetermined open-circuit; a packet generating module, generating a detection packet after receiving a trigger signal; a transmission module, transmitting the detection packet and receiving the detection packet by using a circuit loop; and a comparison module, taking the generated detection packet as a basis signal and taking the received detection packet by using the circuit loop as a comparison signal, wherein the first and third switches are electrically connected as a short-circuit state so as to activate the push-up and pull-down resistors when the comparison signal has a signal width distortion smaller or larger than the basis signal, and the second switch is electrically connected as a short-circuit so as to activate the terminal resistor when the comparison signal comprises a redundant reflection signal or the comparison signal has a signal width equating a predetermined range of signal width.

The resistance arranging method based on a RS-485 network, comprising steps of generating a detection packet after receiving a trigger signal; transmitting the detection packet and receiving the transmitted detection packet by using a circuit loop; taking the generated detection packet as a basis signal and taking the received detection packet by using the circuit loop as a comparison signal; and enabling the first and third switches to be electrically connected as a short-circuit state so as to activate the push-up and pull-down resistors when the comparison signal has a signal width distortion smaller or larger than the basis signal, and enabling the second switch to be electrically connected as a short-circuit so as to activate the terminal resistor when the comparison signal comprises a redundant reflection signal or the comparison signal has a signal width equating a predetermined range of signal width.

The system and method of the present invention have the difference as compared to the prior art that the detection packet is generated and the circuit loop is received, so that the detection packet is taken as the basis signal and the received detection packet through the circuit loop is taken as a comparison signal, and the push-up, pull-down and terminal resistors are arranged by controlling the switch according to the basis signal and the comparison signal.

By using the above technical means, the present invention may achieve in a technical efficacy of promoting convenience of the arranged resistors.

BRIEF DESCRIPTION OF THE DRAWINGS

The invention will become more fully understood from the detailed description given herein below illustration only, and thus is not limitative of the present invention, and wherein:

FIG. 4 is a schematic diagram showing various differences between a basis signal and a comparison signal according to the present invention.

DETAILED DESCRIPTION

The present invention will be apparent from the following detailed description, which proceeds with reference to the accompanying drawings, wherein the same references relate to the same elements.

Prior to the description of the resistance arranging system and method based on a RS-485 network of the present invention, the environment the present invention is applied onto is explained first. The present invention is applied onto a RS-485 network environment, in which the RS-485 is a regular communications standard in industry environment. In application, it is required to adjust a proper push-up resistor, a pull-down resistor and a terminal resistor when the overall network is installed completely, so that interference and reflection on the network are reduced and the network may have sufficient signal level, such as a difference between differential signals larger than 0.2 V so that the network may provide normal communications. The push-up resistor, pull-down resistor and terminal resistor are electrically connected in a manner which will be described with reference to figures.

Figure 1:
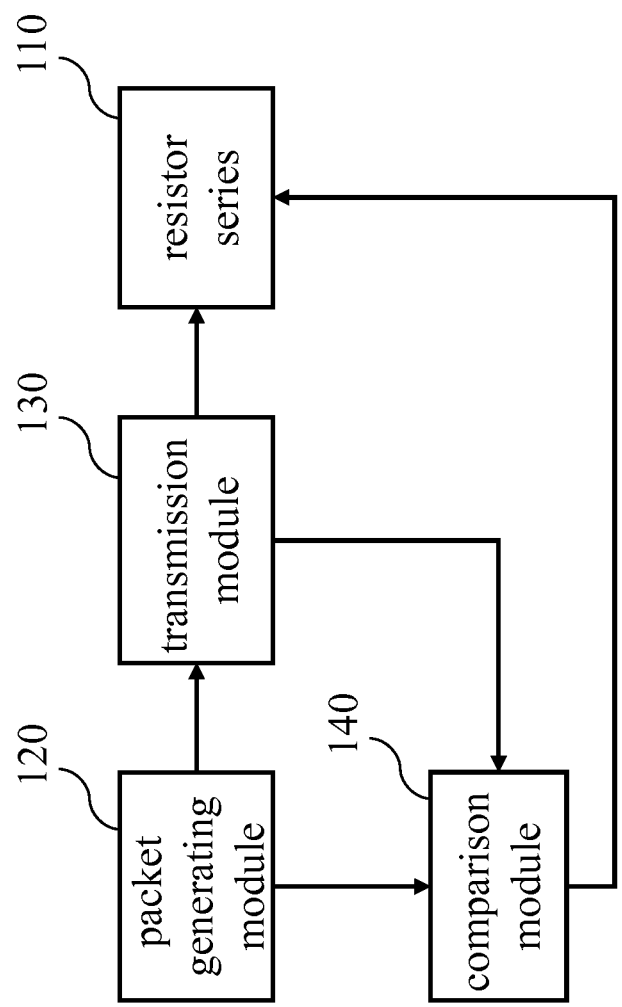
FIG. 1 is a systematic block diagram of a resistance arranging system based on a RS-485 network according to the present invention.

In the following, the resistance arranging system and method based on the RS-485 network of the present invention will be described in detail with reference to figures. Referring to FIG. 1, which is a systematic block diagram of a resistance arranging system based on a RS-485 network according to the present invention. The system comprises a resistor series 110, a packet generating module 120, a transmission module 130 and a comparison module 140.

The resistor series 110 comprises a pull-down resistor, a first switch, a second switch, a terminal resistor, a third switch and a push-up resistor. The first, second and third switches are electrically connected as a predetermined open-circuit.

In real implementation, the terminal resistance has a resistance value of between 90Ω and 220Ω. Or, other proper resistances may be possible. The push-up resistor and the pull-down resistor each have a resistor value between 390Ω and 150KΩ. Or, other proper resistances may be possible.

As to the first, second and third switches, they are each an electronic switch or a mechanical switch. The electronic switch comprises a bipolar junction transistor (BJT) switch, a field-effect transistor (FET) switch and an electronic replay, and the mechanical switch comprises a mechanical relay.

The packet generating module 120 is used to generate a detection packet after receiving a trigger signal. In real implementation, the trigger signal may be generated by clicking a switch or a chip. The manner for generating the detection packet belongs to the prior art, and thus be omitted herein for clarity.

The transmission module 130 is used to transmit the detection packet and receiving the detection packet by using a circuit loop. In real implementation, the transmission module 130 may comprises a transmitter and a receiver, and further comprises an electric circuit loop connection transmitter and receiver, so that the detection packet may be transmitted back to the receiver through the circuit loop without any change when the transmitter transmits the detection packet. How the transmitter and receiver are electrically connected will be described in more detail with reference to figures.

The comparison module 140 is used to take the generated detection packet by the packet generating module 120 as a basis signal and take the received detection packet by using the circuit loop as a comparison signal. The first and third switches are electrically connected as a short-circuit state so as to activate the push-up and pull-down resistors when the comparison signal has a signal width distortion smaller or larger than the basis signal. On the other hand, the second switch is electrically connected as a short-circuit so as to activate the terminal resistor when the comparison signal comprises a redundant reflection signal or the comparison signal has a signal width equating a predetermined range of signal width. It is to be noted that the predetermined range is a time period predetermined.

In other words, the comparison module 140 may compare the detection packet generated by the packet generating module 120 with the detection packet received form the circuit loop. And, four different comparison results may be presented, and they are the signal width distortion smaller than the transmitted detection packet, the signal having a redundant reflection signal, the signal width larger than the transmitted detection packet, and the signal width equating the signal width within a particular range. Subsequently, by means of the four different comparison results, each of the switches is adjusted in its electric connection state to activate the different resistors. Thus, the resistor arrangement of the RS-485 network is automatically finished.

It is to be particularly pointed out that the comparison module 140 may further diagnose the network state. The network state comprises a communications good state, a signal distortion state, a too long network distance state, an exceptional reflection signal state, a redundant terminal resistor adjustment state, and a too many RS-485 nodes. This diagnosis is performed by comparing the waveforms.

Figure 2:
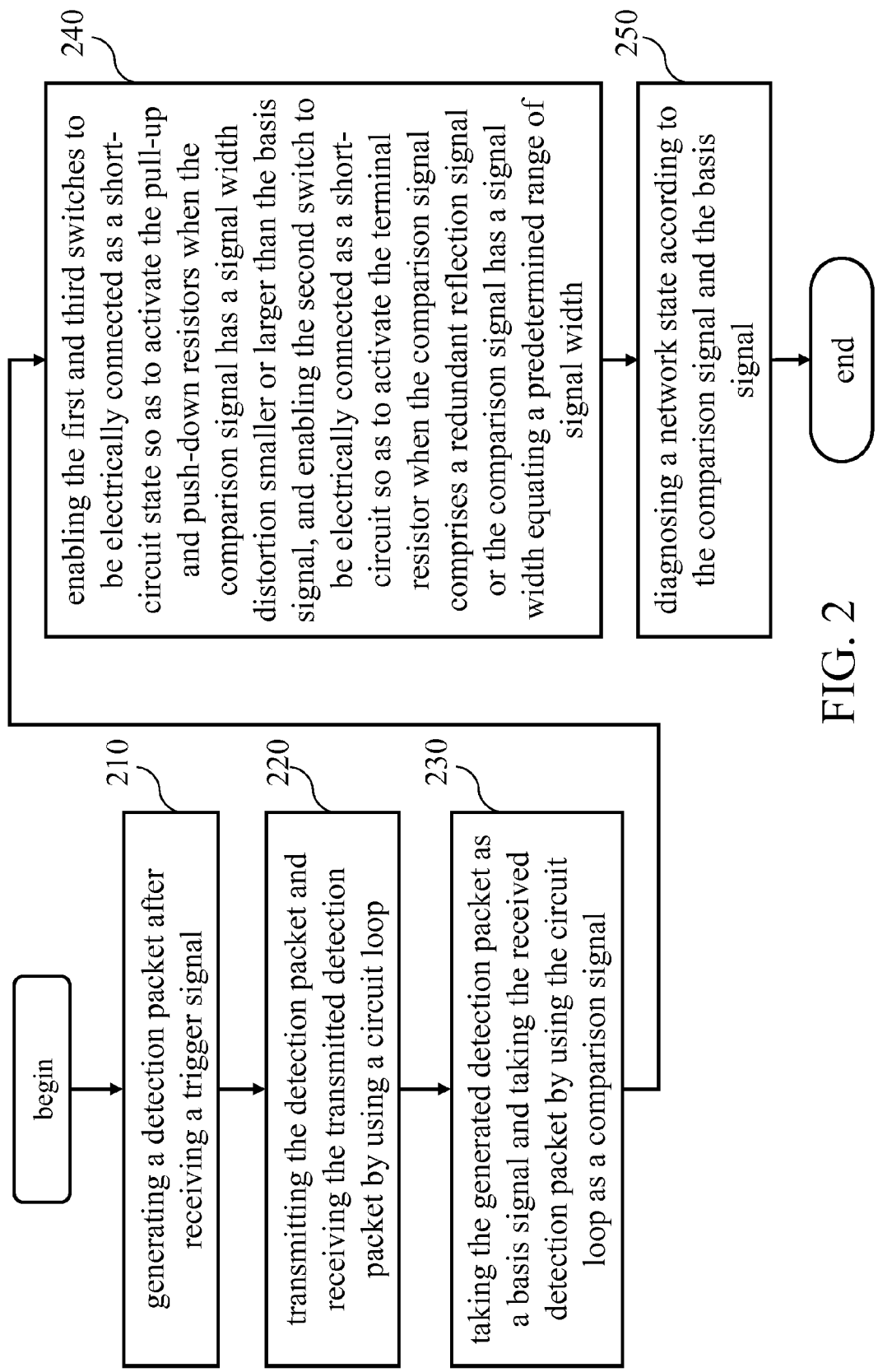
FIG. 2 is a flowchart of a resistance arranging method based on the RS-485 network method according to the present invention.

Thereafter, referring to FIG. 2, a flowchart of a resistance arranging method based on the RS-485 network method according to the present invention is shown. The method comprises the following steps. First, a detection packet is generated after receiving a trigger signal (Step 210). The detection packet is transmitted and the circuit loop is used to receive the detection packet (Step 220).

The generated detection packet is taken as a basis signal and the received detection packet by using the circuit loop is taken as a comparison signal (Step 230). The first and third switches to be electrically connected as a short-circuit state so as to activate the push-up and pull-down resistors when the comparison signal has a signal width distortion smaller or larger than the basis signal, and the second switch is enabled to be electrically connected as a short-circuit so as to activate the terminal resistor when the comparison signal comprises a redundant reflection signal or the comparison signal has a signal width equating a predetermined range of signal width (Step 240).

By using the above steps, the detection packet may be generated and the transmitted may be received by using the circuit loop, so that the detection packet is taken as the basis signal and the received detection packet through the circuit loop as the comparison signal. And, the comparison result between the basis signal and comparison signal is used to control the switch to arrange the push-up resistor, the pull-down resistor and the terminal resistors.

It is to be pointed out that in the step 240 the network state may be diagnosed according to the comparison signal and the basis signal (Step 250). The network state comprising a communications good state, a signal distortion state, a too long network distance state, an exceptional reflection signal state, a redundant terminal resistor adjustment state, and a too many RS-485 nodes.

Figure 3:
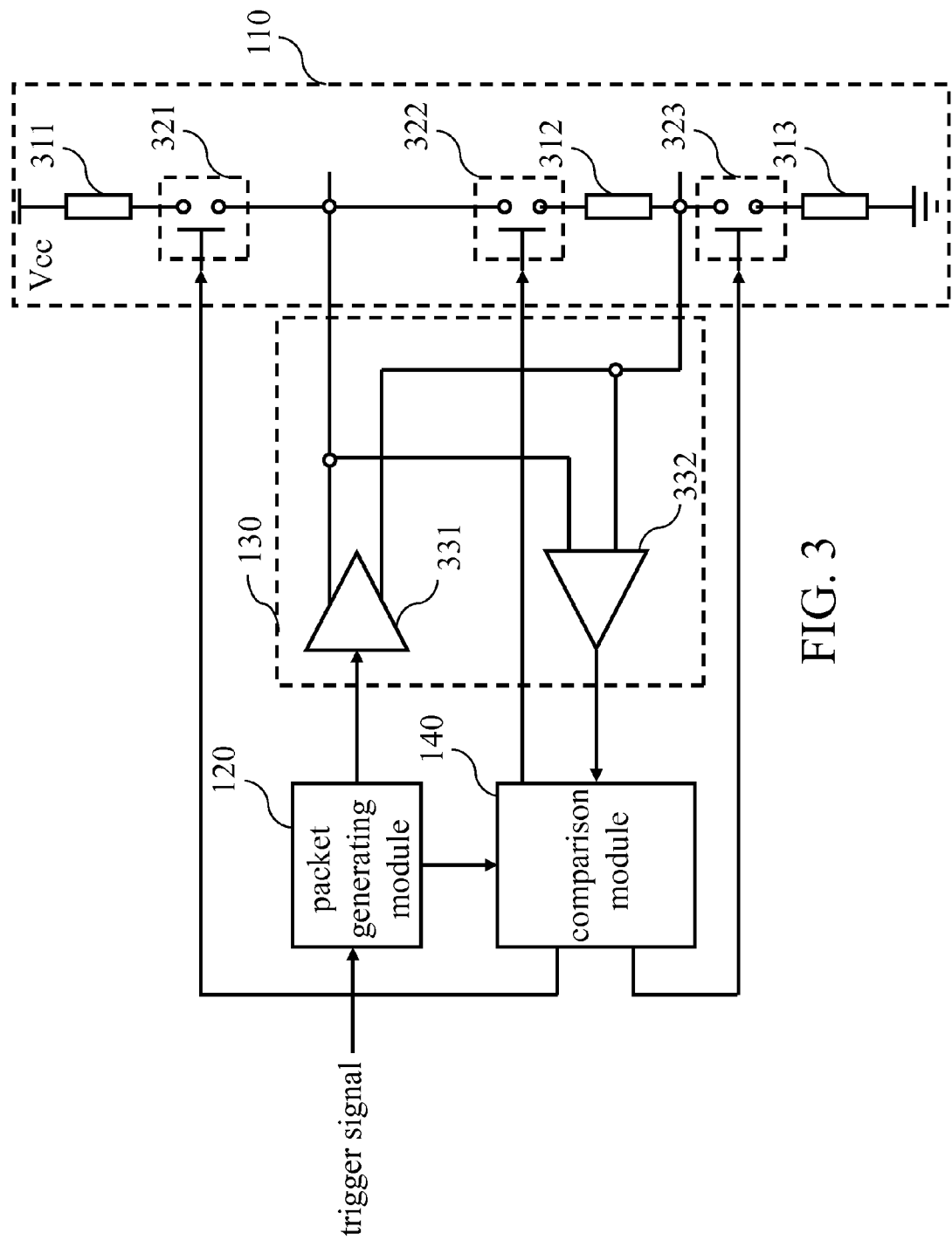
FIG. 3 is a systematic block diagram of a resistance arranging system based on a RS-485 network according to the present invention.

In the following, an embodiment will be described with reference to FIG. 3 and FIG. 4. Referring to FIG. 3 first, a systematic block diagram of a resistance arranging system based on a RS-485 network according to the present invention is provided there for illustration. First, the resistor series 110 comprises a push-up resistor 311, a first switch 321, a second switch 322, a terminal resistor 312, a third switch 323, and a pull-down resistor 313 in series. The first switch 321, the second switch 322, and the third switch 323 have an electrical connection state as a predetermined open-circuit.

When the packet generating module 120 generates a detection packet after receiving a trigger signal. And, the detection packet is transmitted to the transmission module 130 so that a transmitter 331 transmits the detection packet. At the same time, a receiver 332 receives the detection packet through the circuit loop and receiving the detection packet by using the circuit loop. At this time, the comparison module 140 may load in the detection packet generated by itself and receive the detection packet received through the circuit loop. Further, the former is taken as the basis signal and the latter is taken as the comparison signal so that the both may be compared with each other.

At this time, the comparison module 140 takes the generated detection packet as a basis signal and takes the received detection packet by using the circuit loop as a comparison signal, wherein the first and third switches are electrically connected as a short-circuit state so as to activate the push-up and pull-down resistors when the comparison signal has a signal width distortion smaller or larger than the basis signal, and the second switch is electrically connected as a short-circuit so as to activate the terminal resistor when the comparison signal comprises a redundant reflection signal or the comparison signal has a signal width equating a predetermined range of signal width.

Assume now the comparison result shows that the signal width distortion of the comparison signal is smaller or larger than that of the basis signal, the comparison module 140 may enable the first and the third switches 321, 323 to electrically connected as from an open-circuit to a close-circuit, so that the push-up resistor 311 and the pull-down resistor 313 are activated. Assume the comparison signal comprises a redundant reflection signal or the comparison signal has its signal width equating a predetermined range of signal width, the comparison module 140 may enable the second switch 322 to be electrically connected from the close-circuit state to the open-circuit state, so as to activate the terminal resistor 312. As such, by using the comparison result of the detection packet, the resistors may be automatically arranged, so that the RS-485 network may operate normally.

As shown in FIG. 4, which is a schematic diagram showing various differences between the basis signal and the comparison signal according to the present invention, at the left side is basis signal (i.e. the detection packet generated by the packet generating module 120) and at the right side is the comparison signal In real implementation, the case where the comparison signal has its signal width distortion smaller than the signal waveform of the basis signal is denoted as "A". The case where the signal width distortion of the comparison signal is larger than that of the signal waveform of the basis signal is denoted as "B". The case where the comparison signal comprises the signal waveform of the redundant reflection signal is denoted as "C". The case where the signal width of the comparison signal equates a predetermined range of signal width is denoted as "D". As such, based on the basis signal and the comparison signal, the purpose of activating the proper resistors to achieve in the efficacy of automatically arranging the resistors.

In view of the above, the system and method of the present invention have the difference as compared to the prior art that the detection packet is generated and the circuit loop is received, so that the detection packet is taken as the basis signal and the received detection packet through the circuit loop is taken as a comparison signal, and the push-up, pull-down and terminal resistors are arranged by controlling the switch according to the basis signal and the comparison signal. By using the above technical means, the present invention may overcome the issue encountered in the prior art and achieve in a technical efficacy of promoting convenience of the arranged resistors.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A resistance arranging system based on a RS-485 network, comprising:
    a resistor series, comprising a pull-down resistor, a first switch, a second switch, a terminal resistor, a third switch and a push-up resistor in series, wherein the first, second and third switches are electrically connected as a predetermined open-circuit;
    a packet generating module, generating a detection packet after receiving a trigger signal from an external component;
    a transmission module, electrically connected with the packet generating module, and used for transmitting the detection packet through a transmitter and receiving the detection packet through a receiver at the same time by using a circuit loop; and
    a comparison module, electrically connected with the transmission module and the resistor series, and used for taking the generated detection packet as a basis signal and taking the received detection packet by using the circuit loop as a comparison signal, wherein the first and third switches are electrically connected as a short-circuit state so as to activate the push-up and pull-down resistors when the comparison signal has a signal width distortion smaller or larger than that of the basis signal, and the second switch is electrically connected as a short-circuit so as to activate the terminal resistor when the comparison signal comprises a redundant reflection signal or the comparison signal has a signal width equating a predetermined range of signal width.

2. The resistance arranging system based on a RS-485 network as claimed in claim 1, wherein the terminal resistor has a resistance value of between 90Ω and 220Ω.

3. The resistance arranging system based on a RS-485 network as claimed in claim 1, wherein the push-up resistor and the pull-down resistor each have a resistor value between 390Ω and 150KΩ.

4. The resistance arranging system based on a RS-485 network as claimed in claim 1, wherein the first, second and third switches each are an electronic switch or a mechanical switch, the electronic switch comprising a bipolar junction transistor (BJT) switch, a field-effect transistor (FET) switch and an electronic replay, and the mechanical switch comprising a mechanical relay.

5. The resistance arranging system based on a RS-485 network as claimed in claim 1, wherein the comparison module further diagnoses a network state according to the comparison signal and the basis signal, the network state comprising a communications good state, a signal distortion state, a too long network distance state, an exceptional reflection signal state, a redundant terminal resistor adjustment state, and a too many RS-485 nodes.

6. An arranging method based on a RS-485 network, comprising steps of:
    configuring a resistor series, including a pull-down resistor, a first switch, a second switch, a terminal resistor, a third switch and a push-up resistor in series, wherein the first, second and third switches are electrically connected as a predetermined open-circuit;
    generating a detection packet after receiving a trigger signal;
    transmitting the detection packet and receiving the transmitted detection packet by using a circuit loop;
    taking the generated detection packet as a basis signal and taking the received detection packet by using the circuit loop as a comparison signal; and
    enabling the first and third switches to be electrically connected as a short-circuit state so as to activate the push-up and pull-down resistors when the comparison signal has a signal width distortion smaller or larger than signal width distortion of the basis signal, and enabling the second switch to be electrically connected as a short-circuit so as to activate the terminal resistor when the comparison signal comprises a redundant reflection signal or the comparison signal has a signal width equating a predetermined range of signal width.

7. The resistance arranging method based on a RS-485 network as claimed in claim 6, wherein the terminal resistor has a resistance value of between 90Ω and 220KΩ.

8. The resistance arranging method based on a RS-485 network as claimed in claim 6, wherein the push-up resistor and the pull-down resistor each have a resistor value between 390Ω and 150KΩ.

9. The resistance arranging method based on a RS-485 network as claimed in claim 6, wherein the first, second and third switches each are an electronic switch or a mechanical switch, the electronic switch comprising a bipolar junction transistor (BJT) switch, a field-effect transistor (FET) switch and an electronic replay, and the mechanical switch comprising a mechanical relay.

10. The resistance arranging method based on a RS-485 network as claimed in claim 6, further comprising a step of diagnosing a network state according to the comparison signal and the basis signal, the network state comprising a communications good state, a signal distortion state, a too long network distance state, an exceptional reflection signal state, a redundant terminal resistor adjustment state, and a too many RS-485 nodes.

* * * * *